(12) United States Patent
Sasaki (10) Patent No.: US 9,384,581 B2
(45) Date of Patent: Jul. 5, 2016

(54) SYSTEMS AND METHODS FOR REAL-TIME CONVERSION OF VIDEO INTO THREE-DIMENSIONS

(71) Applicant: Affirmation, LLC, Mount Pleasant, SC (US)

(72) Inventor: Hideshi Sasaki, Murrieta, CA (US)

(73) Assignee: AFFIRMATION, LLC, Mount Pleasant, SC (US)

( * ) Notice: Subject to any disclaimer, the term of this patent is extended or adjusted under 35 U.S.C. 154(b) by 419 days.

(21) Appl. No.: 13/867,952

(22) Filed: Apr. 22, 2013

(65) Prior Publication Data

US 2013/0278597 A1 Oct. 24, 2013

Related U.S. Application Data

(60) Provisional application No. 61/636,342, filed on Apr. 20, 2012.

(51) Int. Cl.
*G06T 15/00* (2011.01)
*H04N 13/02* (2006.01)
(Continued)

(52) U.S. Cl.
CPC ............. *G06T 15/00* (2013.01); *H04N 13/026* (2013.01); *G02B 27/225* (2013.01); *H04N 13/0404* (2013.01)

(58) Field of Classification Search
CPC .. G06T 15/00; H04N 13/026; H04N 13/0404; H04N 13/0275
See application file for complete search history.

(56) References Cited

U.S. PATENT DOCUMENTS 8,558,832 B1 * 10/2013 Cook ................. H04N 13/0048
345/422
2008/0150945 A1 * 6/2008 Wang ....................... G06K 9/20
345/427
2008/0309756 A1 * 12/2008 Verburgh ........... H04N 13/0011
348/51

(Continued)

FOREIGN PATENT DOCUMENTS

EP          1 950 980 A1     7/2008
TW        201140496 A      11/2011

OTHER PUBLICATIONS

International Search Report and Written Opinion for related international application No. PCT/US2013/037655, mailed Jul. 25, 2013, in 7 pages

(Continued)

*Primary Examiner* — Brian Yenke
*Assistant Examiner* — Sean Haiem
(74) *Attorney, Agent, or Firm* — Procopio, Cory, Hargreaves & Savitch LLP (57) ABSTRACT

Disclosed herein are systems and methods for enhancing a sequence of video images to add depth and presenting the enhanced images to the user through a lenticular lens arrangement on a display screen for viewing the enhanced images in three-dimensions (3D). The embodiments include the application of image enhancing algorithms which measure spatial and temporal differences between sequential images in an input video stream in order to measure depth within the images and produce one or more interleaved images with depth. Multiple sequential interleaved images may then be created in real-time as the images from the video stream are received, and the sequence of interleaved images may then be presented immediately as a video stream on a display fitted with a lenticular lens to effectively display a 3D video to the user.

20 Claims, 4 Drawing Sheets (51) Int. Cl.
*H04N 13/04* (2006.01)
*G02B 27/22* (2006.01)

(56) References Cited

U.S. PATENT DOCUMENTS

| | | | |
|---|---|---|---|
| 2009/0102916 | A1 | 4/2009 | Saishu et al. |
| 2010/0245548 | A1* | 9/2010 | Sasaki .................. G11B 27/105 348/51 |
| 2011/0026809 | A1* | 2/2011 | Jeong .................... G06T 7/0022 382/154 |
| 2011/0050853 | A1 | 3/2011 | Zhang et al. |
| 2011/0096832 | A1 | 4/2011 | Zhang et al. |
| 2011/0126160 | A1* | 5/2011 | Han .................... H04N 13/0029 715/848 |
| 2011/0169962 | A1* | 7/2011 | Gat .......................... H04N 5/33 348/164 |
| 2011/0175979 | A1* | 7/2011 | Mizutani ............ H04N 13/0055 348/43 |
| 2011/0199463 | A1* | 8/2011 | Gallagher .......... H04N 13/0404 348/53 |
| 2011/0292044 | A1* | 12/2011 | Kim .................... H04N 13/0011 345/419 |
| 2012/0127267 | A1* | 5/2012 | Zhang .................. G06T 7/0071 348/43 |
| 2012/0218393 | A1* | 8/2012 | Fortin .................. G06T 7/0022 348/59 |
| 2012/0229595 | A1* | 9/2012 | Miller ................ H04N 13/0022 348/36 |
| 2012/0314937 | A1* | 12/2012 | Kim .................... H04N 13/0033 382/154 |
| 2013/0162768 | A1* | 6/2013 | Lie ..................... H04N 13/0264 348/43 |
| 2014/0098189 | A1* | 4/2014 | Deng ................. H04N 13/0048 348/43 |
| 2014/0307062 | A1* | 10/2014 | Rotem ................. H04N 13/026 348/50 |

OTHER PUBLICATIONS

Extended European Search Report for European Application No. 1377867.5 mailed on Nov. 3, 2015 in 8 pages.

* cited by examiner

SYSTEMS AND METHODS FOR REAL-TIME CONVERSION OF VIDEO INTO THREE-DIMENSIONS

PRIORITY CLAIM

This application claims the benefit of priority to U.S. Provisional Patent Application No. 61/636,342, filed Apr. 20, 2012, now pending, the contents of which are incorporated herein in their entirety.

BACKGROUND

1. Field of the Invention

Various embodiments described herein relate generally to converting two-dimensional video images into three-dimensional video images in real-time. More particularly, various embodiments are directed in one exemplary aspect to adding depth to a two-dimensional image by calculating spatial and temporal differences between multiple sequential two-dimensional images to produce an interleaved image which is displayed on an auto-stereoscopic display for viewing in three-dimensions.

2. Related Art

There are existing systems which enhance stored or captured video images to improve visibility in adverse conditions. Typical systems receive input images from sources such as thermal, infrared and visible light cameras, recorded video, etc. Existing technologies typically use known video enhancement techniques such as adjustment of contrast and brightness, improvement of intensity characteristics using statistical analysis of the image and manipulation of those characteristics using algorithms for localized image enhancement. However, these existing technologies only enhance two-dimensional images, which lack true depth.

The introduction of observation devices represented a major technological advancement in tactical ability for military applications and generally for visibility in non-military applications. Night Observation Devices (NODs), such as light intensifying devices (night-vision goggles), infrared devices and thermal devices all provide unique forms of image enhancement at night, while other observation devices including thermal devices may be used for daytime image enhancement as well. However, these observation devices have a basic, profound constraint: the inability to convey depth perception to the user. Lack of depth perception results in an inaccurate image of distance, making operations based on observation device images slower, more hazardous and challenging, which increases overall risk for any operation. The problem is costly and dangerous, creating a risk to the user when operating a vehicle or aircraft and, in military applications, compromising the tactical effectiveness of a soldier on the battlefield. The safety and usefulness of observation devices, as well as other imaging systems could be greatly improved if these images could provide realistic depth. Indeed, numerous types of commercial-level and consumer-level imaging applications may benefit from the addition of realistic depth to an image.

Thus, there is a need for improved image processing systems which can provide a realistic image which includes depth and provide a display system which can be easily viewed by any user.

SUMMARY

Disclosed herein are systems and methods for enhancing a sequence of video images to add depth and presenting the enhanced images to the user through a lenticular lens arrangement on a display screen for viewing the enhanced images in three-dimensions (3D). The embodiments include the application of image enhancing algorithms which measure spatial and temporal differences between sequential images in an input video stream in order to measure depth within the images and produce one or more interleaved images with depth. Multiple sequential interleaved images may then be created in real-time as the images from the video stream are received, and the sequence of interleaved images may then be presented immediately as a video stream on a display fitted with a lenticular lens to effectively display a 3D video to the user. The lenticular lens is specified, produced and assembled for each display based on the display characteristics to provide a parallax barrier which allows the user to view the interleaved images in 3D. The original, unenhanced images may be received by an image processing unit and converted into an interleaved video sequence for display on the lenticular-lens equipped display screen in real-time to a user.

In a first exemplary aspect, a method of converting two-dimensional images to three-dimensional images comprises: receiving a sequence of images; processing at least one image of the sequence of images to create a depth map of an image scene; creating a plurality of unique views from the depth map; producing at least one interleaved image pattern from the plurality of unique views; and displaying the at least one interleaved image pattern on a display screen configured with a lenticular lens.

In a further exemplary aspect, a system for converting two-dimensional images to three-dimensional images comprises: an image processing unit configured to: receive a sequence of images; process at least two images of the sequence of images to create a depth map of an image scene; create a plurality of unique views from the depth map; and produce at least one interleaved image pattern from the plurality of unique views; and a display unit with a display screen configured with a lenticular lens which displays the at least one interleaved image pattern.

In a still further exemplary aspect, a computer readable medium containing instructions which, when executed by a computer with a processor and a memory, performs a process comprising receiving a sequence of images; processing at least one image of the sequence of images to create a depth map of an image scene; creating a plurality of unique views from the depth map; producing at least one interleaved image pattern from the plurality of unique views; and displaying the at least one interleaved image pattern on a display screen configured with a lenticular lens.

Other features and advantages should become apparent from the following description of the preferred embodiments, taken in conjunction with the accompanying drawings.

BRIEF DESCRIPTION OF THE DRAWINGS

Various embodiments disclosed herein are described in detail with reference to the following figures. The drawings are provided for purposes of illustration only and merely depict typical or exemplary embodiments. These drawings are provided to facilitate the reader's understanding and shall not be considered limiting of the breadth, scope, or applicability of the embodiments. It should be noted that for clarity and ease of illustration these drawings are not necessarily made to scale.

The various embodiments mentioned above are described in further detail with reference to the aforementioned figured and the following detailed description of exemplary embodiments.

DETAILED DESCRIPTION

The systems and methods described herein provide accurate, realistic night vision video streams with depth by measuring spatial and temporal features of two-dimensional (2D) input video images and creating interleaved images for display in as a three-dimensional (3D) video stream on a display screen fitted with a lenticular lens. The embodiments provide an effective, safe and reliable real-time image processing system capable of delivering a significant advantage over existing two-dimensional (2D) image enhancement devices. The system is capable of taking sequences of images captured by a single camera or image source with a single lens and converting the sequences of images into three-dimensional images in real-time using a lenticular lens display that does not require the use of special eyewear.

In one embodiment, the system may be implemented for use with observation devices such as daytime observation devices using visible or thermal light, or Night Observation Devices (NODs) such as light intensifying devices (night-vision goggles), infrared devices and thermal devices. To integrate depth perception with existing observation devices, the systems provide a hardware/software solution to generate accurate range information for a captured image. The range, or depth, information is used to generate interleaved images which are then displayed on a display system with a lenticular lens to produce realistic depth, suitable for the military and civilian applications. The systems provide a functional model for both infrared and thermal imaging in an active or passive mode. The technical approach for the embodied systems shares common processes for all simulations and real-time display units regardless of the type of input video images.

System Overview

Figure 1:
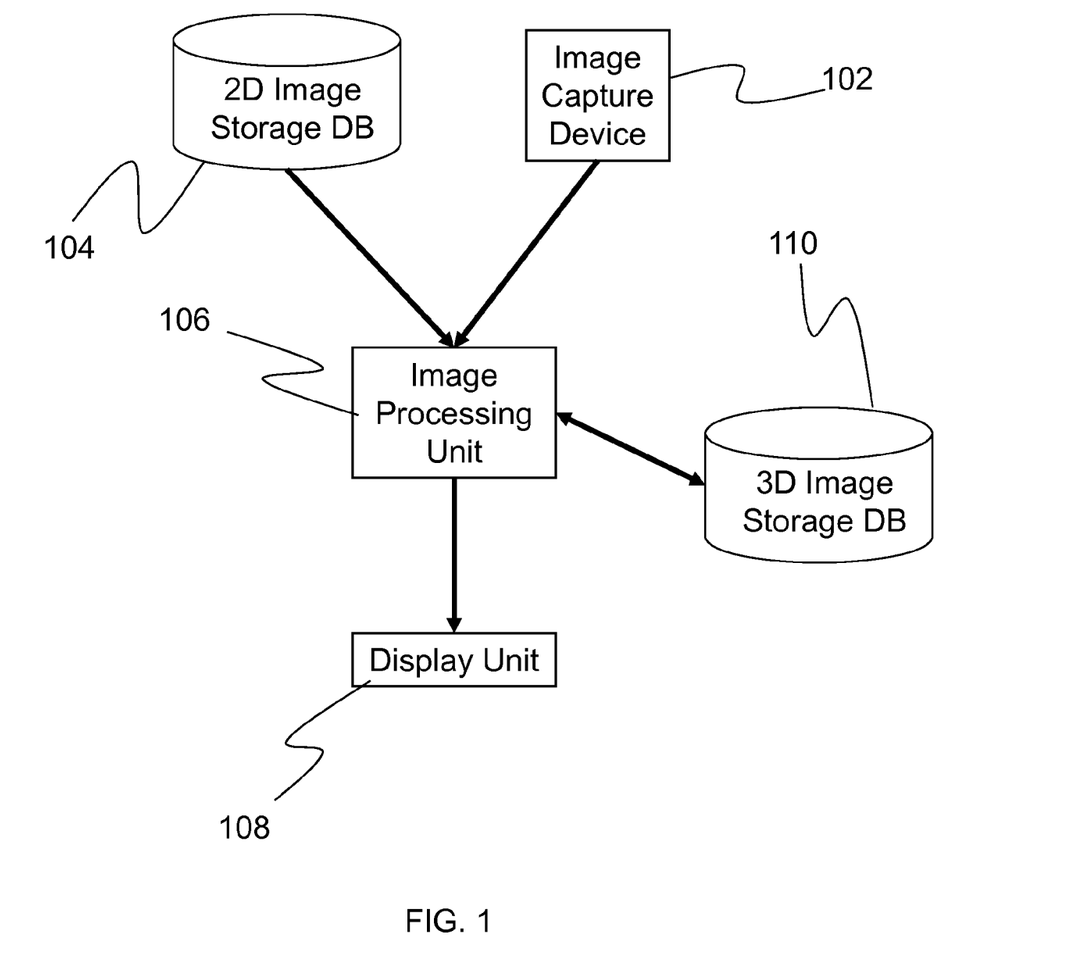
FIG. 1 is a block diagram illustrating an exemplary system for producing and displaying three-dimensional images in real-time, according to one embodiment.

FIG. 1 illustrates a block diagram of one embodiment of a system for producing and displaying three-dimensional (3D) video images from two-dimensional (2D) video images in real-time. One or more image capture devices 102 may be used to capture video in real-time, although previously captured video stored on a 2D image storage database 104 may be used. An image processing unit 106 is connected with the image capture device 102 and/or image storage database 104 in order to receive the video for processing. Once the video is processed to create the interleaved images showing depth, the processed video may be transmitted to a display unit 108 for displaying the interleaved images on a display screen configured with a lenticular lens. In one embodiment, the processed video may be stored temporarily or permanently on a three-dimensional storage database 110 connected with the image processing unit 106.

Figure 2:
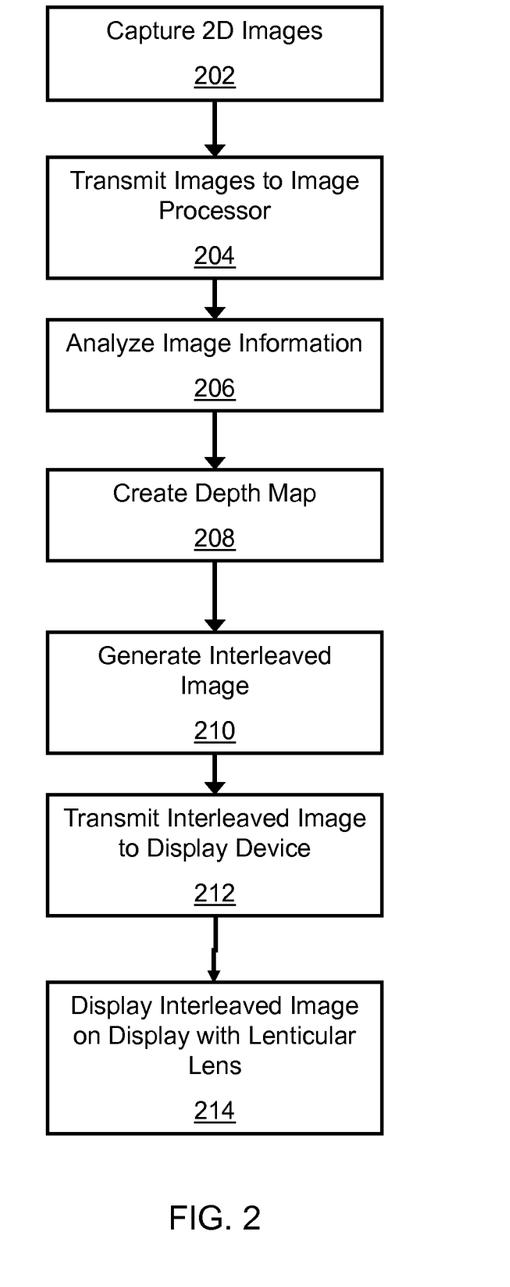
FIG. 2 is a flow diagram illustrating an exemplary method of producing and displaying three-dimensional images in real-time, according to one embodiment.

FIG. 2 illustrates one embodiment of a method of producing and displaying images, according to one embodiment. In a first step 202, a video sequence composed of two-dimensional images is captured by the image capture device 102. The images are then transmitted to the image processing unit in step 204. In step 206, information about the images is analyzed, as will be set forth in further detail below. The information obtained about the images is then used to create a depth map of the images in step 208, after which the depth information from the depth map is used to generate interleaved images with depth in step 210. The interleaved images are then transmitted to a display device in step 212, where they are then displayed, in step 214, on a display screen with a lenticular lens.

Image Capture

The system is capable of accepting video from any of many possible sources; the system needs only to know what standard video format is being delivered. Sources may include but are not limited to observation devices such as night observation devices (NODs) that include light intensifying devices (night vision goggles), thermal imaging cameras, infrared (IR) imaging cameras. Daytime observation devices may also be used as image sources, which include visible light cameras and thermal imaging cameras. Furthermore, existing video streams from standard video formats may also be used. The video may be fed into the software as a live camera feed, where the video stream will be converted and output to the screen and lens system. In one embodiment, the converted video stream may remain in the original format, such as the "tactical green" of a light intensifying device or the color-coded images of a thermal or IR video. The system will also accept input from standard video files stored on any standard computer readable medium such as solid state memory, optical memory, and magnetic memory. The system will accept input from a computer readable transmission medium such as wireless radio frequency, Bluetooth® transmission, or connection to a network.

Image Processing

The embodied systems are capable of data processing in real-time by utilizing software and hardware via a pass-through system. The software generates a 3D view by taking two views and interpolating the stereo view across each lenticule on the screen such that a stereo pair is provided to any user viewing the screen.

In one embodiment, the systems and methods described herein function by exploiting edge information, such as through edge detection, in conjunction with spatial and temporal differences that occur during image acquisition. Captured images are processed by software which generates depth information in real-time by looking at the current frame and the frame prior to the current frame. In one embodiment, two sequential images are used which are separated by approximately 1 millisecond. In one embodiment, the software can also gather depth information from a single image by exploiting edge information and performing image warping in conjunction with translation. From this real-time processing of two sequential images, an interleaved image is generated which highlights the 2D depth cues typically present in an image. Warping, translating, and 2D depth cues are used to help inform a range estimation algorithm. Together the two frames are processed, and disparities between the two images are calculated and weighted such that depth information can be extracted. This depth information is interpreted by the software along with the current frame to produce a multi-view interleaved image.

In one embodiment, the depth information may be represented by a "depth map" or "range to target map," which is essentially a block of memory that stores the values obtained by the range estimation algorithm. The range estimation algorithm generates a map of range to target values of objects in the image by measuring the spatial and temporal changes that occur between camera frames on a per pixel basis. Each range estimation is then weighted against an initial guess at scene topography. This combination increases the accuracy of data points as time increases. Each "depth map" or "range to target map" contains depth information from several prior frames. Every frame that is captured helps to build and perfect a working model of the scene being captured by an image capture device.

In one embodiment, through analysis of each frame of the video input, objects are mapped in relation to their position in the frame and with respect to other objects in the frame. The frame is then broken into several views. The number of views can vary for more or less depth and clarity. The frame is then broken into several sub-regions where the process iterates such that a range estimation measurement for each object can be computed. As new frames are processed the relative position of objects in the frame are combined with temporal information on these objects to improve the accuracy of the original range to target computation. As more frames are added, the accuracy of this range computation improves, allowing for a per-pixel depth map to be created at the same resolution as the input image.

In one embodiment, the algorithm has been optimized for performance such that these calculations are done as fast as the camera can capture the data. In one embodiment, the system can take an incoming 30 frames per second NTSC 2D video signal and convert it to an auto-stereoscopic 3D digital video signal at the same frame rate as the input video signal with no delay. The converted video frames can then be presented to the user in real-time.

In one embodiment, the video processing program is stored on a memory device and is loaded to the image processing unit upon device start up. The image processing unit then is able to receive input from a video source, process the video, and create a depth map which is then used to convert each video frame to add depth to the image. Each converted video frame is then output to a screen which has been modified as described below with the addition of a lenticular lens.

Generating Interleaved Images

In one embodiment, the process of creating interleaved images works by applying the range estimation data contained in the depth map to create n-number of unique views which are woven together on a sub-pixel basis to form an interleaved image pattern. Unique views may be computed views of the scene that simulate what the scene would look like if the capturing camera had been moved to a different point in space when the frame was captured. Each computed view can be thought of as a photo taken of the current scene at the same time but from a different perspective. The system is capable of producing n-numbers of these views. Specific sub-pixel channels may be activated such that their light contributes to the left or right images seen by a user observing the screen. The interleaving pattern varies based on the physical geometry of the screen and lens combination.

This interleaving image pattern is then made to appear auto-stereoscopic or 3D without requiring a user to wear glasses by magnifying the image pattern under a particular lenticular lens array, which is customized to the specific screen specifications. This process is done on a per-frame basis such that the resulting auto-stereoscopic image appears in real-time.

If the input image is of lower resolution than the display screen dimensions, the image and depth map are scaled such that the depth values are linearly interpolated across the display screen. The number of views created from the range map also must be matched to the lens and screen assembly characteristic for optimal depth in the output stream.

Lenticular Lens Display

The resultant interleaved image is then displayed on a screen fitted with a lenticular lens or parallax barrier such that an auto-stereoscopic effect can be observed by the viewer. This 3D image is then presented to the user in real-time via the auto-stereoscopic display. Each specific screen model has unique dimensions to the pixel pattern, and as mentioned above, the lenticular lens dimensions must be optimized to the dimensions of the pixel pattern of the display screen.

In one embodiment, the lenticular lens is a lens which is either embossed into a plastic sheet such as Mylar® or etched glass. The shape of the lens profile is specifically matched for each particular flat screen to be used. If the lens is plastic, it is laminated to a thicker sheet material such as glass or polycarbonate to give the lens stability. In one embodiment, the lens profile is described by the following characteristics: groove pitch, groove angle of cut, groove angle of rotation and groove depth.

Figure 3:
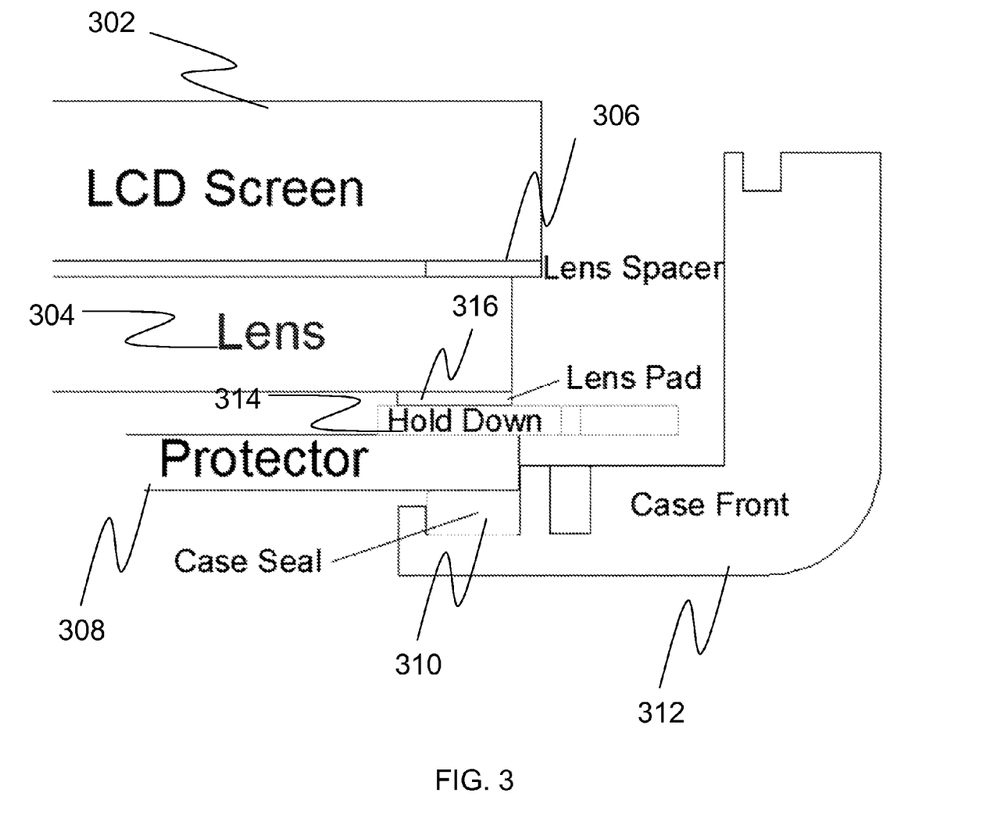
FIG. 3 is a schematic diagram illustrating a display screen with a lenticular lens configured thereon for displaying a three-dimensional image to a user, according to one embodiment.

An example of the lens and screen assembly is shown in FIG. 3. The lens system is made up of a flat panel screen 302, a lenticular lens 304 separated by a lens spacer 306, which provides a specific distance between the flat panel screen 302 and the lens 306. The lens spacer adjusts the focal point of the lens to optimize the perceived depth and clarity of the image. The thickness of the spacer will vary and is used to adjust for the variations in the screen and lens due to manufacturing tolerances.

A protector 308 is positioned adjacent to a case seal 310 of case front 312 of the display, and some type of mechanical device, such as a hold down 314, is positioned between the protector and a lens pad 316 to hold the assembly together. The clamping mechanism can vary and is determined by the screen case design used.

Practical Applications

In one embodiment of the invention, one or more image capture devices and displays may be implemented on a vehicle, such as a car, plane, boat, helicopter, etc. As mentioned above, the input video may be from a Night Observation Device (NOD), an infrared image capture device, a thermal imaging device, or a visible light camera device.

Other applications include range finding devices, portable display devices, head-mounted displays, robot-mounted displays and other vehicle and automobile implementations. The system will increase safety, situational awareness, enhance visual queues for robotic and automated image analysis, and generally increase the speed and effectiveness of image processing for users operating in any level of light, weather or visibility conditions.

Computer Implementation

Figure 4:
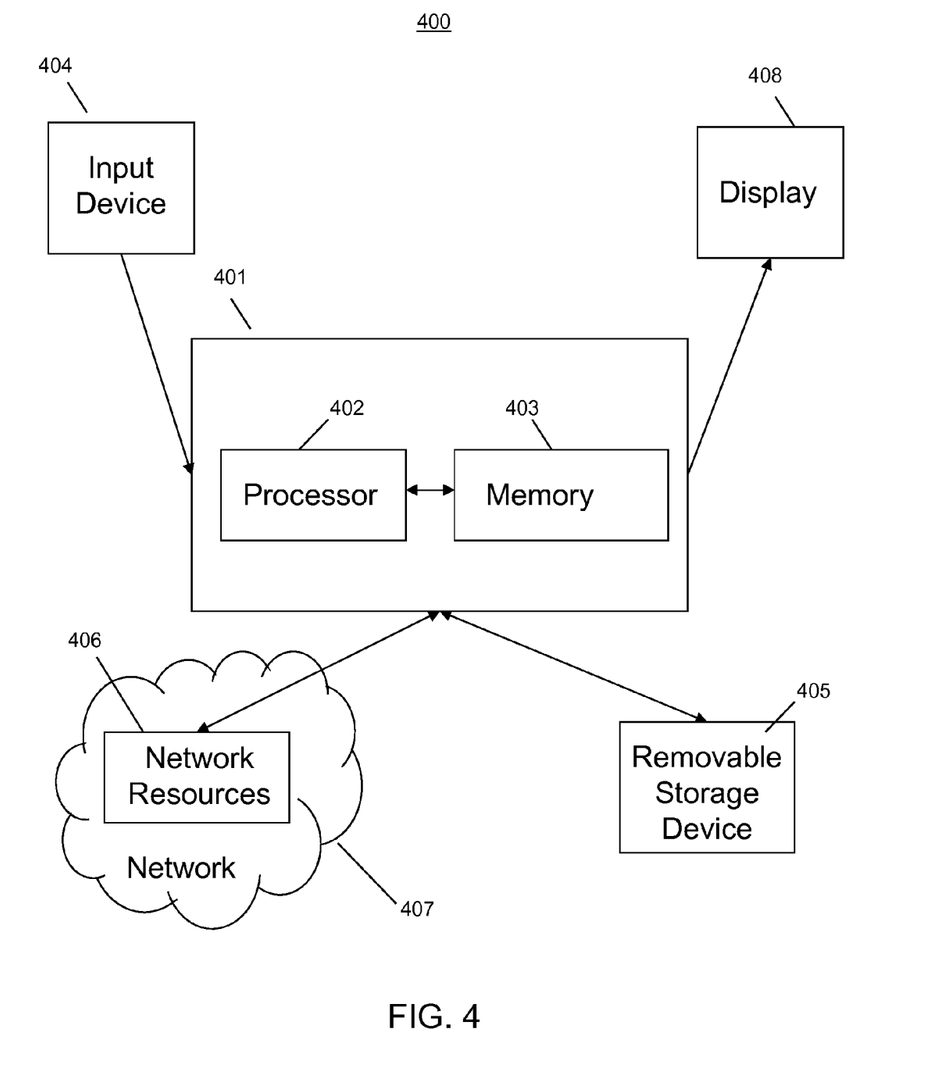
FIG. 4 is block diagram that illustrates an embodiment of a computer/server system upon which an embodiment of the inventive methodology may be implemented.

FIG. 4 is a block diagram that illustrates an embodiment of a computer/server system 400 upon which an embodiment of the inventive methodology may be implemented. The system 400 includes a computer/server platform 401 including a processor 402 and memory 403 which operate to execute instructions, as known to one of skill in the art. The term "computer-readable storage medium" as used herein refers to any tangible medium, such as a disk or semiconductor memory, that participates in providing instructions to processor 402 for execution. Additionally, the computer platform 401 receives input from a plurality of input devices 404, such as a keyboard, mouse, touch device or verbal command. The computer platform 401 may additionally be connected to a removable storage device 405, such as a portable hard drive, optical media (CD or DVD), disk media or any other tangible medium from which a computer can read executable code.

The computer platform may further be connected to network resources 406 which connect to the Internet or other components of a local public or private network. The network resources 406 may provide instructions and data to the computer platform from a remote location on a network 407. The connections to the network resources 406 may be via wireless protocols, such as the 802.11 standards, Bluetooth® or cellular protocols, or via physical transmission media, such as cables or fiber optics. The network resources may include storage devices for storing data and executable instructions at a location separate from the computer platform 401. The computer interacts with a display 408 to output data and other information to a user, as well as to request additional instructions and input from the user. The display 408 may therefore further act as an input device 404 for interacting with a user.

While various embodiments have been described above, it should be understood that they have been presented by way of example only, and not of limitation. The breadth and scope should not be limited by any of the above-described exemplary embodiments. Where this document refers to technologies that would be apparent or known to one of ordinary skill in the art, such technologies encompass those apparent or known to the skilled artisan now or at any time in the future. In addition, the described embodiments are not restricted to the illustrated example architectures or configurations, but the desired features can be implemented using a variety of alternative architectures and configurations. As will become apparent to one of ordinary skill in the art after reading this document, the illustrated embodiments and their various alternatives can be implemented without confinement to the illustrated example. One of ordinary skill in the art would also understand how alternative functional, logical or physical partitioning and configurations could be utilized to implement the desired features of the described embodiments.

Furthermore, although items, elements or components may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

What is claimed is:

1. A method of converting two-dimensional images to three-dimensional images, comprising:
receiving a sequence of images;
processing at least one image of the sequence of images to create a depth map of an image scene, the depth map being based on temporal and spatial changes between the at least one image and one or more prior images in the sequence of images;
creating n-number of unique views from the depth map for two or more left and right image pairs of the image scene at a same instance of time, each unique view being calculated to generate a different camera perspective of the image scene, wherein n is greater than or equal to two;
weaving the n-number of unique views together on a sub-pixel basis to form an interleaved image pattern to display the two or more left and right image pairs at the same instance of time on a display screen configured with a lenticular lens, the weaving being based on a physical geometry of the lenticular lens and the display screen; and
interpolating the two or more left and right image pairs across each lenticule of a plurality of lenticules of the lenticular lens to display the interleaved image pattern as an auto-stereoscopic video sequence.

2. The method of claim 1, wherein the sequence of images is received from an image capture device.

3. The method of claim 2, wherein the image capture device is one of a light intensifying device, an infrared camera and a thermal imaging camera.

4. The method of claim 1, wherein the sequence of images is received from an image database.

5. The method of claim 1, wherein the processing of the at least one image, the creating a plurality of unique views, the producing of the at least one interleaved image pattern and the displaying of the at least one interleaved image pattern are performed in real-time.

6. The method of claim 1, wherein the at least one interleaved image pattern is displayed as a video on the display screen.

7. The method of claim 1, wherein the lenticular lens is configured to match the dimensions of a pixel pattern of the display screen.

8. A system for converting two-dimensional images to three-dimensional images, comprising:
a display unit with a display screen configured with a lenticular lens; and
an image processing unit configured to
receive a sequence of images,
process at least two images of the sequence of images to create a depth map of an image scene, the depth map being based on temporal and spatial changes between the at least one image and one or more prior images in the sequence of images,
create n-number of unique views from the depth map for two or more left and right image pairs of the image scene at a same instance of time, each unique view being calculated to generate a different camera perspective of the image scene, wherein n is greater than or equal to two,
weave the n-number of unique views together on a sub-pixel basis to form an interleaved image pattern to display more than two left and right image pairs of the image scene at a same instance of time on the display screen, the weaving being based on a physical geometry of the lenticular lens and the display screen, and
interpolate the two or more left and right image pairs across each lenticule of a plurality of lenticules of the lenticular lens to display the interleaved image pattern as an auto-stereoscopic video sequence.

9. The system of claim 8, wherein the sequence of images is received from an image capture device.

10. The system of claim 9, wherein the image capture device is one of a light intensifying device, an infrared camera and a thermal imaging camera.

11. The system of claim 8, wherein the sequence of images is received from an image database.

12. The system of claim 8, wherein the processing of the at least two images, the creating a plurality of unique views, the producing of the interleaved image pattern and the displaying of the interleaved image pattern are performed in real-time.

13. The system of claim 12, wherein the at least one interleaved image pattern is displayed as a video on the display screen.

14. The system of claim 8, wherein the lenticular lens is configured to match the dimensions of a pixel pattern of the display screen.

15. A non-transitory computer readable medium containing instructions which, when executed by a computer with a processor and a memory, perform a process comprising:

receiving a sequence of images;

processing at least one image of the sequence of images to create a depth map of an image scene, the depth map being based on temporal and spatial changes between the at least one image and one or more prior images in the sequence of images;

creating n-number of unique views from the depth map for two or more left and right image pairs of the image scene at a same instance of time, each unique view being calculated to generate a different camera perspective of the image scene, wherein n is greater than or equal to two;

weaving the n-number of unique views together on a sub-pixel basis to form an interleaved image pattern to display more than two left and right image pairs of the image scene at a same instance of time on a display screen configured with a lenticular lens, the weaving being based on a physical geometry of the lenticular lens and the display screen; and interpolating the two or more left and right image pairs across each lenticule of a plurality of lenticules of the lenticular lens to display the at least one interleaved image pattern as an auto-stereoscopic video sequence on a display screen configured with a lenticular lens.

16. The computer readable medium of claim 15, wherein the sequence of images is received from an image capture device.

17. The computer readable medium of claim 16, wherein the image capture device is one of a light intensifying device, an infrared camera and a thermal imaging camera.

18. The computer readable medium of claim 15, wherein the sequence of images is received from an image database.

19. The computer readable medium of claim 15, wherein the processing of the at least one image, the creating a plurality of unique views, the producing of the at least one interleaved image pattern and the displaying of the at least one interleaved image pattern are performed in real-time.

20. The computer readable medium of claim 15, wherein the at least one interleaved image pattern is displayed as a video on the display screen.

* * * * *